W. W. BARRETT.
PLANTER.
APPLICATION FILED JUNE 2, 1919.
1,336,124.
Patented Apr. 6, 1920.
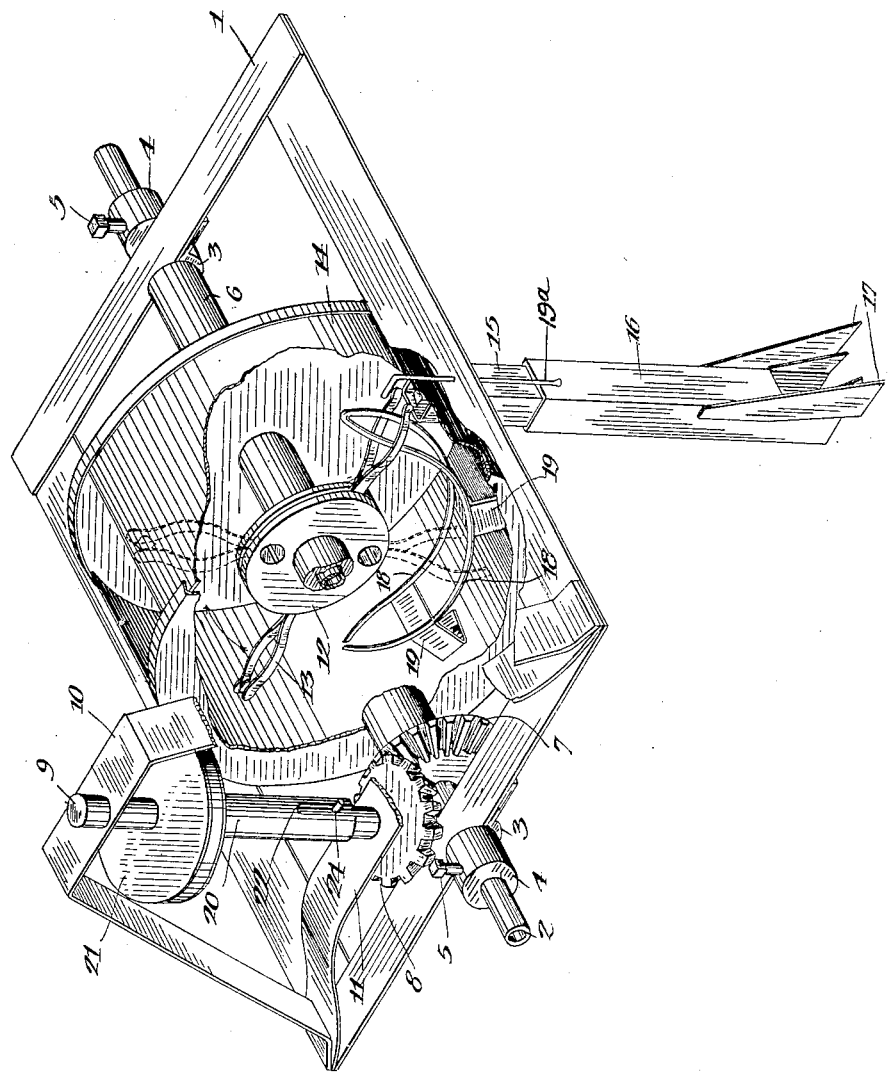
WITNESSES
W. W. Barrett, INVENTOR.
BY
ATTORNEYS

UNITED STATES PATENT OFFICE.

WILLIAM W. BARRETT, OF LEWISTON, IDAHO.

PLANTER.

1,336,124.  Specification of Letters Patent.  Patented Apr. 6, 1920.

Application filed June 2, 1919. Serial No. 301,174.

*To all whom it may concern:*

Be it known that I, WILLIAM W. BARRETT, a citizen of the United States, and a resident of Lewiston, in the county of Nez Perce and State of Idaho, have invented certain new and useful Improvements in Planters, of which the following is a specification.

My invention is an improvement in planters, and has for its object to provide a planter adapted for either garden or field planting, wherein means is provided for picking up a predetermined quantity of individual seeds, as for instance one or more, and delivering them to a furrow opener or the like to be delivered to the furrow.

In the drawings is shown a perspective view of the improved planter with parts broken away.

In the present embodiment of the invention a suitable supporting frame 1 is provided of substantial rectangular formation, and longitudinally of this frame at the center thereof there is journaled a shaft 2, the said shaft being journaled in bearings 3 on the frame. The shaft is held from longitudinal movement by means of collars 4 secured in place on the shaft by set screws 5.

This shaft has mounted thereon a sleeve 6 within the frame, and this sleeve is provided at one end with a bevel gear 7, which meshes with a gear 8 on a vertical shaft 9, journaled in bearing arms 10 and 11 connected with the frame. A pair of disks 12 is secured to the sleeve intermediate its ends, and a series of pairs of resilient arms 13 is held by the disks.

In the present instance four pairs of arms are provided, and the members of each pair are outwardly offset away from each other intermediate their ends, and normally contact at their ends, each pair being held at one end between the disks. These arms and the disks rotate at the center of a drum 14 which is held in the frame, the sleeve 6 being at the axis of the drum. This drum is of such size that when the sleeve is rotated, the free ends of the arms will move near the wall of the drum, and will move through the seed held within the drum at the lowest part thereof.

A suitable leg is provided, consisting of an upper section 15 secured to the frame and opening through the drum as shown, and a lower section 16 which is mounted to slide on the other section and has covering mechanism indicated at 17 connected therewith. The arms 13 are arranged to deliver the seed which they pick up on moving through the bulk of seed in the drum into the upper end of the leg or furrow opener. Mechanism is provided for separating the members of each pair of arms just as they come into position such that the seed held between the arms will fall into the upper end of the section 15, and to hold the arms open until they have well entered the bulk of the seed and moved almost through the same, and for then permitting the arms to close, in order that they may pick up more seed.

The said means comprises a track way or cam 18 which is supported by brackets 19 connected with the peripheral wall of the drum. This cam is composed of a wire bent to form two members lying alongside each other in spaced relation, and inclining toward each other at their ends. The arrangement is such that the arms will be opened in position to drop the seed in the furrow opener, and will be permitted to close at the proper time to pick up another load of seed. The separating of the arms also permits them to pass the furrow opener without interference from the said opener. I also provide a member 19$^a$ secured upon the foot and projecting into the drum. This member has its upper end bent at right angles and disposed over the entrance to the discharge chute in the path of travel of the arms. The seeds upon reaching this bent end will be engaged thereby and disengaged positively from the arms even though there might be a considerable tendency to stick.

A sleeve 20 is mounted on the shaft 9, and this sleeve has secured thereto a friction disk 21 which may be driven in any suitable manner. The sleeve has a longitudinally extending slot 22 at its lower end, which is engaged by a pin 24 extending radially from the shaft 9. The wheel 21 is adapted to engage the face of a disk, and to vary the speed of rotation of the sleeve 6, the disk 21 is moved toward and from the shaft 2.

In operation the seed being placed in the drum, and the mechanism being mounted on a suitable support, it is drawn through the field, the sleeve 6 being rotated from a moving part of the support. As the sleeve 6 rotates, the arms 13 will move in succession through the seed, and as each pair move past the leg or chute 15, the arms will be opened, and as they leave the cam, they will close on the seed, picking up one or more. The seed will be carried around, the wheel as a whole moving in the direction of the arrow, until the seed held by the arms is directly above the chute. The arms will then be opened, and the seed will drop into the chute. The arms 13 may be cupped away from each other for receiving the seed, that is they may be spoon shaped.

I claim:

A planter comprising a relatively stationary drum for containing seed, a discharge chute at one side thereof and opening thereinto, a wheel rotatable within the drum and carrying a plurality of gripping arms, means for moving the arms apart as they approach the entrance to the chute, and a member extending into the drum and having an angular end disposed above the entrance to the chute in the path of travel of the arms whereby to dislodge seeds held by the arms.

WILLIAM W. BARRETT.